United States Patent [19]
Pecoraro

[11] 3,811,854
[45] May 21, 1974

[54] METHOD OF MAKING FLOAT GLASS
[76] Inventor: George A. Pecoraro, 439 Dakota Dr., Lower Durrell, Pa. 15068
[22] Filed: Mar. 12, 1973
[21] Appl. No.: 340,514

Related U.S. Application Data
[63] Continuation-in-part of Ser. No. 138,822, April 29, 1971, abandoned.

[52] U.S. Cl.................................. 65/27, 65/99 A
[51] Int. Cl............................................. C03b 5/16
[58] Field of Search ............... 65/25, 27, 99 A, 136

[56] References Cited
UNITED STATES PATENTS
| | | | |
|---|---|---|---|
| 2,701,220 | 2/1955 | Smith | 65/27 X |
| 3,238,030 | 3/1966 | O'Connell | 65/27 |
| 3,337,320 | 8/1967 | Dyck | 65/27 |
| 3,523,781 | 8/1970 | Levecque | 65/136 X |
| 3,597,178 | 8/1971 | Tilton | 65/27 |

Primary Examiner—Robert J. Lindsay, Jr.
Attorney, Agent, or Firm—E. Kears Pollock; John W. Linkhauer

[57] ABSTRACT

In making high-quality flat glass by the float process, a product substantially free of tridymite-frost stone defects is obtained by mechanically dislodging, during brief and infrequent time intervals, substantially all of the readily dislodgeable particles of tridymite adhering to the silica roof of the refining zone of the melting furnace. Preferably, the removal is done by blowing hot gases against the roof.

2 Claims, No Drawings

METHOD OF MAKING FLOAT GLASS

CROSS REFERENCE TO RELATED APPLICATION

This application is a continuation-in-part of application Ser. No. 138,822, filed Apr. 29, 1971 now abandoned. That application is specifically incorporated by reference herein, and priority is claimed for this application by virtue of the filing date of application Ser. No. 138,822.

BACKGROUND OF THE INVENTION

1. Field of the Invention

This invention relates to the production of high-quality flat glass by the float process, and in particular, it relates to a procedure whereby the observed frequency of defects in the product that are attributable to tridymite-frost stones is kept at a desirable low level.

2. Description of the Prior Art

The production of high-quality flat glass by the float process, such as that of U.S. Pat. No. 3,083,551, is practiced on a large scale. In that art, it is known that in order to obtain a commercially acceptable product, care must be exercised to eliminate, to the greatest extent possible, the common kinds of point defects that occur in such glass, such as seeds, blisters, ream knots, and stones. Moreover, the measures taken toward the elimination or avoidance of such defects must be such as to have no substantial deleterious effect upon the distortion quality of the glass. For an operation to be commercially successful, it is generally necessary to product glass exhibiting a defect density (considering defects of all known kinds) on the order of at the most 4.0 per 100 square feet of glass, and preferably lower.

In the production of flat glass, it is known that one sort of defect occasionally encountered is the tridymite-frost stone defect. It is known that this kind of defect results from the action of alkaline vapors upon melting- and refining-furnace roof refractories, which are commonly of silica refractory material. The tridymite-frost stone problem is of relatively little importance in the production of plate glass, because such defects are usually removed by the subsequent grinding and polishing operations. In a float-glass process, however, such grinding and polishing is avoided, and it becomes necessary to use other measures to avoid difficulty with this defect.

It is known, moreover, that there is usually no problem with tridymite stones during the first 8 to 12 months of use of a new or newly lined furnace. Sometimes, the problem does not develop, even later. If it does, various means are suggested in the prior art for dealing with it, but it is submitted that all of these have drawbacks in comparison with the instant invention.

In an article entitled, "The Siliceous Scale Dropped From the Tank Furnace Crown" by N. Araki, it is suggested that the problem can be overcome by using a silica brick of especially low lime content. The drawbacks of this approach are the greater cost of such refractories and the need for a cold repair when it is taken with respect to a presently operating furnace.

In references such as British Pat. No. 1,067,006; British Pat. No. 1,035,415; U.S. Pat. No. 3,240,581; and U.S. Pat. No. 3,238,030, it is suggested that the problem may be overcome by supplying to the furnace a sodium-sulphur compound and a chemically reducing atmosphere. This has the drawbacks of requiring close control of process conditions, possible deterioration of the silica refractories, contamination of glass, and the ability to treat only the areas which can be reached with the equipment.

In general, furnace design engineers have avoided using for the refiner crown any refractory materials other than silica. The silica is preferred because of its low cost, relatively low density, and favorably low coefficient of thermal expansion at furnace-roof operating temperatures.

In Canadian Pat. No. 851,103, it is suggested that the problem may be overcome by reconstructing the furnace roof so that a constant bleeding of gases through the pores of the silica refractory may serve to protect the refractory form attack by the alkali vapors. Adoption of this expedient necessitates a furnace shut-down for cold repair. It appears questionable, moreover, that the amount and direction of gas permeating the refractories is sufficient or proper to have the desired effect, unless special silica refractories, more porous than those normally used, are employed, and at that, it is questionable whether there may be obtained a porous silica-refractory material that has both the required porosity and at the same time, sufficient hot strength to enable it to be used in a furnace-roof structure of substantial span.

SUMMARY OF THE INVENTION

In accordance with the invention, float glass is produced in a process wherein glass-batch materials are fed to a first or feed end of generally elongated melting furnace and heated to form a bath of molten glass, and the glass then passes along the length of said furnace into a refining zone that is adjacent to a second or exit end of the furnace, with at least the refining zone having a roof of silica. Furthermore, the invention comprises the step of mechanically dislodging, during brief and infrequent time intervals, such as not more than 36 hours in duration and not more frequently than 4 times per year, substantially all of the readily dislodgeable particles of tridymite (i.e., the potential stone defects) that adhere to the roof of the refining zone of the furnace. The mechanical dislodging is performed when the tridymitefrost stone defect density is greater than about 0.3 per 100 square feet of glass. The mechanical-dislodging step is effective to reduce the tridymite-stone defect density to substantially nil, i.e., not over about 0.01 per 100 square feet of glass. Although in a broad aspect of the invention, the mechanical dislodging may be effected with a rod or probe of heat-resistant material such as stainless steel, it is preferably done by blowing large amounts of a gas of relatively high temperature, such as about 2200° Fahrenheit against the roof of the refining zone with sufficient force (about 200 feet per second nozzle velocity) to dislodge the particles of tridymite therefrom; this may be done without cooling down the furnace, and preferably during some appropriate time interval, such as that of a dilution or thickness change, so that no production is lost.

DESCRIPTION OF THE PREFERRED EMBODIMENTS

The invention is concerned with the production of high-quality flat glass by the float process, i.e., a process wherein glass-batch materials are fed to a first end of a generally elongated melting furnace and heated to form a bath of molten glass and said glass passes along the length of said furnace and into a refining zone that is adjacent to a second or exit end of the furnace, passing thereafter over a lip and onto a bath of molten tin, where by the action of heat and forces exerted upon the glass, the glass is brought to a desired thickness of a suitably high viscosity and then lifted off the molten tin or suitable subsequent processing. In such a process, the refining zone of the melting furnace usually has a roof of silica refractory material, and as is known, it is as a result of the reaction between alkali vapors volatilized from the batch and glass in the melter chamber and the silica of the roof of the refiner that the tridymite-frost stone defect is generated.

For the purposes of this invention, the refining zone of the melting furnace is considered as comprising, in furnaces having a waist, the region from the beginning of such waist and extending downstream to the entry to the exit canal. In furnaces not having a waist, the refining zone may be considered as starting at the entry of the exit canal and extending uptank for about 10 to 40 per cent of the overall length of the furnace.

In accordance with the invention, material is mechanically dislodged from the roof of the refiner zone of the melting furnace.

One way of doing this is to use a probe or rod of suitable heat-resistant material, such as stainless steel. This may be done while the melting furnace is in operation, but if this approach is chosen, it is sometimes impossible or inconvenient to each all of the locations that need to be probed or scraped in order to obtain the desired or preferred results.

It is also possible to practice the probing or scraping while the furnace is shut down for a cold repair. Inasmuch as such a cold repair is usually made at intervals quite infrequent, such as about every 3 to 5 years or possibly more, it is likely that it will not prove practical to count upon operating the process with desirable freedom from trouble of the refining zone too much, with the result that the product float glass exhibits ream as a result of Rayleigh instabilities. On the other hand, to the extent that cold air is useful, and it really is at some times quite satisfactory, the practice herein proposed is quite unobvious to those skilled in the art because of the problem of prospective spalling.

Accordingly, in accordance with a preferred embodiment of the invention, the mechanical dislodging is done by blasting against the silica roof of the refiner zone one or more jets of combustion gas, of the composition indicated above. The conditions of combustion are such that a theoretical flame temperature on the order of 2,100° to 2,300° Fahrenheit is achieved.

In principle, the volume of hot gases used and the size of the nozzle used and the mode of operation (a burner inserted through the side wall of furnace and suitably stationed, versus use of a hand-held lance) is a matter of choice, so long as the desired thorough mechanical dislodgment of the tridymite particles adhering to the crown of the refiner zone is achieved. The nozzle from which the jet issues may vary in diameter from ¼ inch to 12 inches, and it may be brought within one-half inch or less from the roof or it may be as much as ten inches distant therefrom. It is conceivable, of course, that the means for introducing the combustion-product gases may be of such great diameter and the flow rate therethrough may be of such great magnitude, that no dislodging effect is required; alkali-containing vapors from the melter headspace do not reach the refractory. This is not considered within the scope of the instant invention, which is limited to mechanical dislodgment of the tridymite onto the ribbon of glass, this usually and most conveniently being practiced with the use of a gas-stream means. In every instance, it is necessary to correlate the mode of operation, the size of the nozzle, the nozzle-roof spacing, and the feed rate of gas to be used so that the desired mechanical dislodgment is achieved. Most conveniently, however, conditions are used such that the necessary mechanical dislogdment can be effected with stationary burners inserted through openings in the side wall of the refiner section of the furnace. One satisfactory set of conditions, for a refiner zone 30 feet wide and 60 feet long is the use of two burners, one put through one side wall and the other through the other side wall, each having a nozzle diameter of 12 inches and spaced about 30 inches from the crown, with a flow of combustion products at about 2200° Fahrenheit of 180,000 standard cubic feet per hour (about half through each nozzle). The approximate velocity of the gas adjacent to the refractory surface is thus 140 miles per hour. This may range from 40 miles per hour to 400 miles per hour or even higher, to suit requirements of the process. The nozzle velocity of gas being employed in the practice of this invention will preferably be within the range of from 100 to 120 feet per second although higher velocities, such as, for example 200 feet per second may be employed without detrimental effect other than added costs incidental to developing such velocities.

One example of a suitable gas is (for operations on the scale indicated above) the products of combustion of 2,000 standard cubic feet per minute of natural gas (substantially methane) with 20,000 standard cubic feet per minute of air.

For best results, substantially the whole surface of the roof of the refining zone of the furnace is treated so as to mechanically dislodge any particles of tridymite adhering thereto that are so loosely held as to be likely to become dislodged and create tridymite-frost stone defects in the product glass. As the treatment of the refining-zone roof becomes more ideally thorough, the results in terms of defect density attributable to tridymite-frost stones in the product glass is correspondingly decreased, and it is considered that in accordance with the invention, the treatment should be at least sufficiently thorough as to decrease such defect density to one-third or less of its value before the treatment. It is possible in many instances to decrease the density of defects attributable to tridymite stones to about 0.01 or less per 100 square feet, i.e., substantially nil. This is to be contrasted with a pre-treatment defect density attributable to tridymite stones that is on the order of 4.0 per 100 square feet or even substantially higher.

The duration of a treatment may vary considerably, depending upon such factors as the seriousness of the problem, the size of the roof, and the mode of operation employed, but it will in general range from a few hours to 1 or 2 days.

Timing of the treatment may also be varied within limits to suit requirements. Even with a furnace that has a relatively severe tendency to form tridymite-frost stones, it should not be necessary to conduct the treatment more often than about 2 times per year, or 5 days per year. In most instances, it suffices to treat about once every 8 to 14 months. The timing may be determined by monitoring the tridymite-stone defect density and then conducting the treatment upon the next convenient occasion after the defect density has risen to a predetermined value, such as 0.5 or 0.9 per 100 per square feet of glass. A particularly convenient occasion is the time of making a change in the composition of the glass that is being produced by float line. Such a change is sometimes called a "dilution change," and it requires in most instances about 1 to 2 days to accomplish. Inasmuch as the glass that is produced during a dilution change is usually culleted, it is convenient to conduct the treatment during such a change, since the treatment then entails no additional loss of production. Another convenient time for the treatment is during a thickness change or a ream upset.

In the event that the feed rate of gases used for mechanical dislodgment of the tridymite-frost particles is quite great, it is preferable to provide either a vent or exhaust means associated with the refiner zone or a serviceable barrier that segregates the headspaces of the refiner zone and the melter zone; otherwise, the firing of the uptank burners in the melting zone may be affected deleteriously. High-volume gas blasts are obviously to be preferred over ones of lesser force. The venting or exhausting may be done conveniently by opening the doors of an appropriately located skim bay, if the furnace involved has one.

I claim:

1. In the production of high-quality flat glass by the float process, wherein glass batch materials are fed to a first end of a generally elongated melting furnace and heated to form molten glass, said glass passes along the length of said furnace into a refining zone that is adjacent to a second or exit end of said furnace and has a roof of silica refractory material, said glass passes from said refining zone into a float forming chamber and said glass is formed into a continuous sheet of glass, the improvement comprising the steps of:

blowing a gas having a temperature of from about 1,800°F. to about 2,400°F. against the roof of said refining zone at a velocity of at least about 40 mph in the vicinity of the roof with force sufficient to dislodge particles of tridymite therefrom, depositing said dislodged particles in a portion of said glass, and separating a portion of said continuous sheet of glass from the remainder of said continuous sheet of glass, said separated portion corresponding to said portion of glass into which said dislodged particles are deposited;

wherein these steps are carried out when tridymite has formed on the roof in sufficient amount to dislodge therefrom causing tridymite stone defects in the glass and are carried out for a sufficient time such that when stopped the glass produced is substantially free of tridymite stone defects.

2. The process as defined in claim 1, characterized in that said gas is blown from a nozzle at a nozzle velocity of from about 100 to about 120 feet per second.

* * * * *